US012565000B2

(12) United States Patent
Saito et al.

(10) Patent No.: US 12,565,000 B2
(45) Date of Patent: Mar. 3, 2026

(54) IN-SITU REACTIVE CURING AND INFILTRATION IN BINDER JET ADDITIVE MANUFACTURING

(71) Applicant: UT-Battelle, LLC, Oak Ridge, TN (US)

(72) Inventors: Tomonori Saito, Oak Ridge, TN (US); Amelia M. Elliott, Oak Ridge, TN (US); Dustin B. Gilmer, Oak Ridge, TN (US); Lu Han, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 192 days.

(21) Appl. No.: 18/222,645

(22) Filed: Jul. 17, 2023

(65) Prior Publication Data

US 2024/0017484 A1      Jan. 18, 2024
US 2024/0239042 A9      Jul. 18, 2024

Related U.S. Application Data

(60) Provisional application No. 63/389,998, filed on Jul. 18, 2022.

(51) Int. Cl.
*B29C 64/165*       (2017.01)
*B22F 10/14*        (2021.01)
(Continued)

(52) U.S. Cl.
CPC ............ *B29C 64/165* (2017.08); *B22F 10/14* (2021.01); *B33Y 10/00* (2014.12); *B33Y 70/10* (2020.01); *B22F 2999/00* (2013.01)

(58) Field of Classification Search
CPC ....... B29C 64/165; B33Y 10/00; B33Y 70/00; B22F 10/14; B22F 2999/00
See application file for complete search history.

(56) References Cited

U.S. PATENT DOCUMENTS 4,055,528 A       10/1977   Kim
10,040,216 B2 *   8/2018   Bai ......................... B22F 10/14
(Continued)

OTHER PUBLICATIONS

Maravola et al., "Epoxy Infiltrated 3D Printed Ceramics for Composite Tooling Applications," Additive Manufacturing 25, pp. 59-63 (2019).

*Primary Examiner* — Nahida Sultana
(74) *Attorney, Agent, or Firm* — WARNER NORCROSS + JUDD LLP

(57)                    ABSTRACT

A method of binder jet additive manufacturing (BJAM) is provided. The method includes feeding a supply of powder particles to a powder bed, delivering an organic binder onto the powder bed in select locations of each layer to form a porous green part, and introducing to the binder a secondary component that chemically reacts with the binder to form a solid polymer matrix around the powder particles. The secondary component is introduced either by: (i) infiltration of the secondary component into the porous green part; or (ii) by combining the secondary component with the powder particles prior to feeding the powder particles to the powder bed. A binder system for BJAM is also provided. The binder system includes a reactive pair including an organic binder that is capable of being deposited on a powder bed; and a secondary component that is reactive with the organic binder.

8 Claims, 8 Drawing Sheets

(51) Int. Cl.
    *B33Y 10/00*         (2015.01)
    *B33Y 70/10*         (2020.01)

(56)             References Cited

U.S. PATENT DOCUMENTS

| | | | |
|---|---|---|---|
| 2005/0080191 A1* | 4/2005 | Kramer | B33Y 70/00 |
| | | | 525/191 |
| 2016/0271878 A1* | 9/2016 | Nuechterlein | C22C 1/10 |
| 2019/0099945 A1* | 4/2019 | Hsing | C04B 28/02 |
| 2020/0023584 A1* | 1/2020 | Portela | B29C 64/30 |
| 2020/0184632 A1* | 6/2020 | Crane | G06T 7/586 |
| 2020/0306829 A1* | 10/2020 | Achten | B29C 71/02 |
| 2021/0387259 A1* | 12/2021 | Barnes | B33Y 10/00 |
| 2023/0405881 A1* | 12/2023 | Albalawi | B33Y 10/00 |

* cited by examiner

Acrylates
Michael Acceptor

PETeA

PETA

TMPTA

PEI 800
Micheal donor

IN-SITU REACTIVE CURING AND INFILTRATION IN BINDER JET ADDITIVE MANUFACTURING

CROSS-REFERENCE TO RELATED APPLICATIONS

This application claims the benefit of U.S. Provisional Application No. 63/389,998, filed Jul. 18, 2022, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to a method of binder jet additive manufacturing, and more particularly to a reactive binder system for use in binder jet additive manufacturing.

BACKGROUND OF THE INVENTION

Additive manufacturing generally refers to the formation of a tangible three-dimensional object from a digitally stored model by depositing or joining material layer-by-layer. Additive manufacturing processes include of powder bed fusion, material extrusion, material jetting, binder jetting, or directed energy deposition. Binder jetting, also referred to as binder jet additive manufacturing (BJAM), involves the layer-by-layer deposition (printing) of a binding adhesive agent onto consecutive layers of typically powdered material. i.e., layers of a powdered bed. After deposition of the binder onto the powdered bed is complete, typically the binder is cured and the resulting cured object is de-powdered to obtain a green part and then subjected to sintering and/or other heat treatment to obtain the finished part. BJAM is well-suited for manufacturing customized tools and dies for industrial manufacturing due to its high production rates, low operator burden, high resolution, and ability to process low-cost feedstock such as silica sand. However, weakness of green parts produced using various powder materials including silica sand in BJAM processes is a limiting factor, and lengthy post-curing after printing adds time and cost to BJAM processes. In BJAM, the binder is responsible for the mechanical strength of the green parts. Conventional binders are no-bake or self-hardening binders based on a corrugated interfacial interaction, furfuryl alcohol polymerization or phenol-formaldehyde reaction. These binders impart relatively low mechanical strength, making the manufacturing of functional tooling using silica sand and other powder materials in BJAM challenging.

SUMMARY OF THE INVENTION

A method of binder jet additive manufacturing is provided. The method includes the use of a reactive binder paired with monomeric or polymeric infiltrates or coatings. The pairing of a reactive binder with the infiltrate/coating allows for in-situ curing (i.e., curing of formed parts without the application of an external stimulus such as heat) and/or post-infiltration (i.e., infiltration of cured parts with infiltrant that reacts with the reactive binder) in binder jet additive manufacturing processes to increase the strength of finished parts, decrease process time, and/or increase throughput.

More particularly, the method includes feeding a supply of powder particles to a powder bed layer-by-layer with a leveling roller. The method further includes delivering a binder in the form of an organic material onto the powder bed in select locations of each layer to bind the layers of powder together and to thereby form a porous green part. The method further includes introducing to the binder a secondary component that chemically reacts with the binder to form a solid polymer matrix around the powder particles. The secondary component is introduced either by: (i) infiltration of the secondary component into the porous green part; or (ii) by combining the secondary component with the powder particles prior to feeding the powder particles to the powder bed.

In specific embodiments, the step of combining the secondary component with the powder particles includes either: (i) mixing the secondary component with the powder particles; or (ii) coating of the secondary component on the powder particles.

In specific embodiments, the binder is present in an amount in the range of 0.1 wt. % to 90 wt. % relative to the powder particles.

In specific embodiments, a saturation of the powder bed with the binder is in the range of 5% to 140%.

In specific embodiments, the secondary component constitutes 1 to 50 volume % of the green part.

In specific embodiments, the binder is delivered by drop-on-demand inkjetting.

In particular embodiments, the drop-on-demand inkjetting is one of piezoelectric inkjetting or thermal inkjetting.

In specific embodiments, the organic binder and the secondary component are monomers, polymers, or a mix of both.

In specific embodiments, the organic binder and the secondary component together are a group of either: (i) a Michael donor and a Michael acceptor; (ii) an acidic material and a basic material; or (iii) an epoxy resin and a nucleophile.

A binder system for a binder jet additive manufacturing process is also provided. The binder system includes a reactive pair. The reactive pair includes an organic binder that is capable of being deposited on a powder bed, and a secondary component that is reactive with the organic binder. The binder system provides for in-situ curing and/or post-infiltration reactivity in binder jet additive manufacturing by combination of the secondary component with the organic binder in the powder bed or in a porous green part formed from the powder bed.

In specific embodiments, the organic binder and the secondary component are monomers, polymers, or a mix of both.

In specific embodiments, the organic binder and the secondary component forming the reactive pair together are a group of either: (i) a Michael donor and a Michael acceptor; (ii) an acidic material and a basic material; or (iii) an epoxy resin and a nucleophile.

In particular embodiments, the organic binder and the secondary component together form a group of a Michael donor and a Michael acceptor, wherein the Michael donor is selected from a group consisting of amine-based monomers and polymers having a molecular weight of from 60 to 2,000,000 g/mol, thiol-containing polymers, diamines, triamines, tetraamines, dithiols, trithiols, and tetrathiols, and wherein the Michael acceptor is selected from a group consisting of diacrylates, triacrylates, tetraacrylates, and cyanoacrylates.

In certain embodiments, the Michael donor is one of polyethyleneimine (PEI), glutathione, dithiothreitol, trithio-threitol, 1,2-propanedithiol, 1,2-benzenedithiol, trimethyl-amine, tris(3-mercaptopropionate), pentaerythriotol (3-mer-captopropionate), trimethylamine, ethylenediamine, dimethylethylenediamine, cadaverine, 1,2-diaminopropane, phenylenediamine, diethylenetriamine, tris(2-aminoethyl) amine, and triethylenetetramine.

In certain embodiments, the Michael acceptor is one of ethylene glycol diacrylate, trimethylolpropane triacrylate (TMPTA), hexanediol diacrylate, ethyl cyanoacrylate (ECA), pentaerythritol tetraacrylate (PETeA), pentaerythri-tol triacrylate (PETA), and tris[2-(acryloyloxy)ethyl] isocya-nurate.

In particular embodiments, the organic binder and the secondary component together form a group of an acidic material and a basic material, wherein the acidic material is selected from a group consisting of carboxylic acid-contain-ing polymers, sulfonate polymers, dicarboxylates, tricar-boxylates, tetracarboxylates, disulfonates, trisulfonates, and tetrasulfonates, and wherein the basic material is selected from a group consisting of amine-polymers, ammonium polymers, diamines, triamines, tetraamines, and multi-func-tional ammonium compounds.

In certain embodiments, the acidic material is one of poly(acrylic acid), poly(acrylic acid)-co-(maleic acid), poly (vinyl sulfonic acid), poly(styrene sulfonate), dimethyl biphenyl-4,4'-dicarboxylate, 2,5-thiophenedicarboxylic acid, triethyl 1,1,2-ethanetricarboxylate, triethyl methanet-ricarboxylate, triethyl 1,3,5-triazinane-1,3,5-tricarboxylate, biphenyl-3,3',5,5'-tetracarboxylic acid, and tetrasodium pyrene-1,3,6,8-tetrasulfonate.

In certain embodiments, the basic material is one of polyethyleneimine (PEI), polyvinylpyroridone, a copolymer of polyethyleneimine and polyvinylpyroridone, a polyacry-late, a methacrylate with quaternary ammonium, and poly (diallyldimethylammonium).

In particular embodiments, the organic binder and the secondary component together form a group of an epoxy resin and a nucleophile, wherein the epoxy resin is selected from a group consisting of a diepoxy, a bisphenol A diepoxy, an aliphatic diepoxy, a triepoxy, and a tetraepoxy, the epoxy resin including a polymeric segment, and wherein the nucleophile is selected from a group consisting of amine-based monomers and polymers having a molecular weight in the range of from 60 to 2,000,000 g/mol, diamines, tri-amines, tetraamines, dithiols, trithiols, tetrathiols, multi-functional hydroxyl compounds, and carboxylates.

In certain embodiments, the polymeric segment is one of polyethylene glycol (PEG), polypropylene glycol (PPG), polybutadiene, polyethylene-butylene, polypropylene (PP), and polydimethylsiloxane (PDMS).

In certain embodiments, the nucleophile is polyethylene-imine (PEI).

These and other features of the invention will be more fully understood and appreciated by reference to the descrip-tion of the embodiments and the drawings.

DETAILED DESCRIPTION OF THE CURRENT EMBODIMENTS

As discussed herein, the current embodiments relate to a method of binder jet additive manufacturing and binder system for binder jet additive manufacturing. The method and system include pairing an organic reactive binder with a complementary secondary component to increase the strength of formed parts, to add functionality to formed parts, and/or to decrease the process time to form parts by binder jet additive manufacturing which thereby increases throughput of formed parts. The reactive binder is jetted onto a powder bed during layer-by-layer formation of the part. The secondary component may be introduced to the reactive binder by reactive infiltration in which the second-ary component is filled into a porous green part formed by the reactive binder and powder of the powder bed, or by reactive particle coating in which the secondary component is mixed with or coated onto the powder of the powder bed prior to jetting of the reactive binder.

Figure 1:
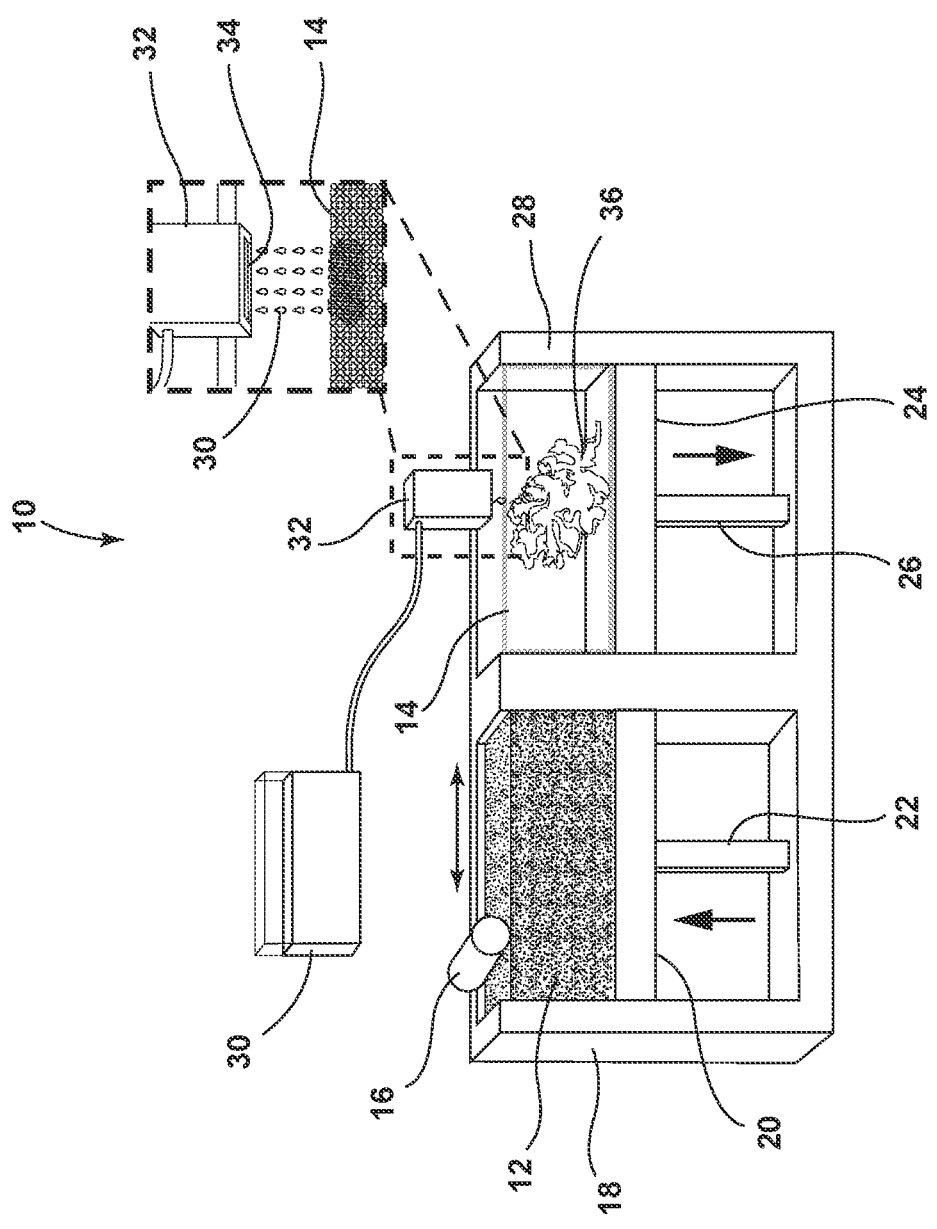
FIG. 1 is a schematic view of a binder jet additive manufacturing (BJAM) process in accordance with embodi-ments of the disclosure.

As generally illustrated in FIG. 1, the method 10 includes feeding a supply of powder particles 12 to a powder bed 14 layer-by-layer with a leveling roller 16. The supply of powder particles 12, which may be but are not limited to sand particles (e.g., silica sand), ceramic particles, metal particles, composite particles, reclaimed concrete particles, or sawdust particles, is stored in a supply reservoir 18 on a supply tray 20 that is raised one step at a time by a feed piston 22 to push a layer of powder particles out of the supply reservoir 18. The leveling roller 16 transfers the layer of powder particles 12 from the supply reservoir 18 to the powder bed 14 which is formed layer-by-layer on a build platform 24 that is lowered one step at a time by a build piston 26 within a build reservoir 28.

The method also includes delivering a binder material 30 onto the powder bed 14 in select locations of each layer to bind the layers of powder together and to thereby form a porous green part. Particularly, an inkjet printhead 32 moves horizontally along the x and y axes of the powder bed 14 and ejects a liquid organic binder material from an array of nozzles 34 to thereby deposit the binder material 30 onto select locations of the powder bed 14 that correspond to cross-sectional layers of the object 36 being formed. The object 36 is formed where the powder particles 12 of the powder bed 14 are bound by the binder material 30. The binder material 30 is preferably delivered by drop-on-demand inkjetting in which a pressure change is used to generate droplets, and the printhead 32 may be but is not necessarily limited to a piezoelectric inkjetting head or a thermal inkjetting head. In a thermal inkjetting head, a small thin-film heater forms a vapor pocket within a chamber of the printhead to generate droplets of binder material, whereas in a piezoelectric inkjetting head a piezoelectric element expands and contracts due to an electric current to create a pressure wave that generates droplets of binder material. Alternatively, the binder material may be delivered by continuous inkjetting in which a continuous stream of liquid is ejected, droplets form according to the Rayleigh frequency, and a charged deflection plate deflects droplets that are not used to bind powder particles together. The saturation of the powder bed 14 with the ejected binder material 30 may be in the range of 5% to 140%. The saturation is defined as the percent of voidspace in the powder bed filled with liquid binder during jetting (3D printing) and can be calculated by the following formula (1):

$$\text{Saturation} = \frac{V_{binder}}{V_{viod}} = \frac{100,000 \times V_{drop}}{\left(1 - \frac{D}{100}\right) \times x \times y \times z}$$

in which $V_{binder}$ is the volume of the binder, $V_{void}$ is the volume of pores in the powder bed calculated based on the powder packing density D (for silica sand the packing density is approximately 50%), $V_{drop}$ is the volume of one drop, and x, y, and z is the spacing of the drops from each other on the powder bed in μm. Saturation is therefore a measured value of how much binder volume is being added to the powder bed in a given geometry of a part. No powder bed is 100% dense, so saturation is the measure of void space in the part.

The above steps of supply powder particles 12 by stepwise raising the supply piston 22 and spreading the powder particles 12 over the powder bed 14 on the build platform 24, and depositing binder material 30 onto the powder bed 14 and stepwise lowering the build platform 24, are repeated sequentially until the entire object 36 has been formed. The object 36 formed by this process can then be removed from the build platform and de-powdered to remove excess powder particles from the exterior and interior passages of the object to thereby obtain a porous green part. Powder particles may occupy approximately 40% to 60% of the volume of the green part. The binder material may be present in an amount in the range of 0.1 wt. % to 90 wt. % relative to the powder particles.

In accordance with embodiments of the present disclosure, the method further includes introducing a secondary component that chemically reacts with the binder to form a solid polymer matrix around the powder particles. The binder material and the secondary component together define a reactive pair that together cure to increase the strength of the green part or to form the green part without the need for thermal curing. The secondary component is introduced to the binder material either by infiltration of the secondary component into the porous green part ("reactive infiltration") or by combining the secondary component with the powder particles prior to feeding the powder particles to the powder bed ("reactive coating" or "reactive curing"). In reactive coating/reactive curing the secondary component can be combined with the powder particles by mixing the secondary component with the powder particles and/or by coating the secondary component on the powder particles. It should be understood from the above that in reactive infiltration, the step of introducing the secondary component to the binder material occurs after completion of the steps of feeding the powder particles and delivering the binder onto the powder particles, i.e. after formation of the porous green part (after de-powdering of the formed object) to impart added strength to the green part, whereas in reactive coating/reactive curing the secondary component is introduced to the binder material when the binder material is ejected onto the powder bed during the step-by-step, layer-by-layer formation of the object that is built to obtain the porous green part in order to solidify/cure the green part in-situ as it is formed in the powder bed. In either case, the secondary component may constitute 1 to 50 volume % of the resulting green part after introduction of the secondary component to the binder material. For example, a smaller powder particle will pack at a higher packing density forming a denser green part, while a larger powder particle will not pack as densely leaving more void space for the secondary component to fill when it is infiltrated into the green part.

Each of the organic binder material and the secondary component may be a monomer or polymer, and together the organic binder material and secondary component may be both monomers, both polymers, or a mixture of monomer(s) and polymer(s). Particularly, in accordance with embodiments of the present disclosure, the organic binder and the secondary component together define a reactive pair that is a group of either: (i) a Michael donor and a Michael acceptor in which the reaction mechanism is a Michael addition reaction; (ii) an acidic material and a basic material in which the reaction mechanism is an acid-base reaction; or (iii) an epoxy resin and a nucleophile in which the reaction mechanism is an epoxy-nucleophile reaction.

In the case that the reactive pair is a Michael donor and a Michael acceptor, the Michael donor may be one or more of amine-based monomers and polymers having a molecular weight of from 60 to 2,000,000 g/mol, thiol-containing polymers, diamines, triamines, tetraamines, dithiols, trithiols, and tetrathiols. In specific embodiments, the Michael donor may be polyethyleneimine (PEI), glutathione, dithiothreitol, trithiothreitol, 1,2-propanedithiol, 1,2-benzenedithiol, trimethylolpropane tris(3-mercaptopropionate), pentaerythriotol (3-mercaptopropionate), trimethylamine, ethylenediamine, dimethylethylenediamine, cadaverine, 1,2-diaminopropane, phenylenediamine, diethylenetriamine, tris(2-aminoethyl)amine, and/or triethylenetetramine. The Michael acceptor may be one or more of diacrylates, triacrylates, tetraacrylates, and cyanoacrylates. In specific embodiments, the Michael acceptor may be ethylene glycol diacrylate, trimethylolpropane triacrylate (TMPTA), hexanediol diacrylate, ethyl cyanoacrylate (ECA), pentaerythritol tetraacrylate (PETeA), pentaerythritol triacrylate (PETA), and/or tris[2-(acryloyloxy)ethyl] isocyanurate.

In the case that the reactive pair is an acidic material and a basic material, the acidic material may be one or more of carboxylic acid-containing polymers, sulfonate polymers, dicarboxylates, tricarboxylates, tetracarboxylates, disulfonates, trisulfonates, and tetrasulfonates. In specific embodiments, the acidic material may be poly(acrylic acid), poly(acrylic acid)-co-(maleic acid), poly(vinyl sulfonic acid), poly(styrene sulfonate), dimethyl biphenyl-4,4'-dicarboxylate, 2,5-thiophenedicarboxylic acid, triethyl 1,1,2-ethanetricarboxylate, triethyl methanetricarboxylate, triethyl 1,3,5-triazinane-1,3,5-tricarboxylate, biphenyl-3,3',5,5'-tetracarboxylic acid, and/or tetrasodium pyrene-1,3,6,8-tetra-sulfonate. The basic material may be one or more of amine-polymers, ammonium polymers, diamines, triamines, tetraamines, and multi-functional ammonium compounds. In specific embodiments, the basic material may be poly-ethyleneimine (PEI), polyvinylpyroridone, a copolymer of polyethyleneimine and polyvinylpyroridone, a polyacrylate, a methacrylate with quaternary ammonium, and/or poly(diallyldimethylammonium).

In the case that the reactive pair is an epoxy resin and a nucleophile, the epoxy resin may be one or more of a diepoxy, a bisphenol A diepoxy, an aliphatic diepoxy, a triepoxy, and a tetraepoxy, and the epoxy resin may include a polymeric segment. In specific embodiments, the polymeric segment may polyethylene glycol (PEG), polypropyl-ene glycol (PPG), polybutadiene, polyethylene-butylene, polypropylene (PP), and/or polydimethylsiloxane (PDMS). The nucleophile may be one or more of amine-based mono-mers and polymers having a molecular weight in the range of from 60 to 2,000,000 g/mol, diamines, triamines, tet-raamines, dithiols, trithiols, tetrathiols, multifunctional hydroxyl compounds, and carboxylates. In specific embodi-ments, the nucleophile may be polyethyleneimine (PEI).

EXAMPLES

The present method is further described in connection with the following laboratory examples, which are intended to be non-limiting.

Hyperbranched polyethyleneimine (PEI) has strong inter-facial interactions with powder particles used in binder jet additive manufacturing (BJAM) due to the presence of its primary and secondary amine groups. This functionality enables PEI to form strong green parts when used as a binder with silica sand, and further allows for reactive secondary infiltration and washout functionality. The PEI binder lever-ages polymer-particle interactions with its primary and secondary amine groups to promote strong polymer-particle interactions with powder particles. Additionally, PEI's hyperbranched structure provides low viscosity, high solu-bility, and limited crystallinity, making it ideal for piezo-electric drop on demand (DOD) inkjetting process. These properties, long with a low molecular weight (~800 g/mol) allow PEI to be dispersed in a solvent mixture with a wide range of slid loadings, enabling fine control of the polymer content within the green part to tailor the strength for various applications.

Polyethylenimine (PEI, branched, Sigma-Aldrich, aver-age Mw~800 by LS, average Mn~600 by GPC) was used without further purification. Furan and Super Glue (EZ Bond CA, 5 CPS) were obtained and used as is. Trimeth-ylolpropane triacrylate (TMPTA), pentaerythritol triacrylate (PETA), and pentaerythritol tetraacrylate (PETeA) were obtained from Sigma Aldrich and used as is. Foundry silica sand (SiO$_2$) with a mean diameter of 150 μm was obtained from ExOne Corporation. 1-propanol, ACS, 99.5+%, and deionized water (H$_2$O) were obtained from Sigma Aldrich and used as is. Iso-propanol (70% concentration) was obtained from McMaster-Carr and used as is.

Each binder material must have its viscosity and surface tension adjusted with a solvent mixture for optimal droplet formation, and it also needs to be balanced with the kinetics of the binder's penetration into the powder bed. The binder's penetration into the powder is important as it controls the rate and volume of binder incorporation into the green parts, which affects print time and mechanical strength of the green parts. PEI binder has a wide range of possible formulations in comparison to conventional binders. To provide sufficient rheological properties, PEI was dispersed into a carrier fluid of 75 weight percent (wt. %) H$_2$O and 25 wt. % 1-propanol (75:25 of water:1-proponal; alternatively the carrier fluid may be 80:20 water:1-proponal) which enabled tuning of its viscosity and surface tension depending on the solid loading wt. % of the solution. In particular, for a binder to be printable it must have the correct rheological characteristics to be utilized within the printhead delivery mechanism. One of these criteria that is key to the printability is the Ohne-sorge number (Oh). The Ohnesorge number was first iden-tified by Fromm to characterize droplet formation for inkjet printing and described as follows:

$$Oh = \frac{\sqrt{WE}}{Re} = \frac{u}{\sqrt{\gamma \rho D}}$$

$$We = \frac{\rho V^2 D}{\gamma}$$

$$Re = \frac{\rho VD}{u}$$

in which u is dynamic viscosity, ρ is the density, and γ is the surface tension of the binder, respectively, D is the nozzle diameter of the printhead, We is the Webers Number, and Re is the Reynolds number. These numbers give a guideline of the printability of a fluid utilizing inkjet technology. To meet this criterion a polymer or monomer in this system can be diluted with a solvent which broadly expands the range of pintable materials. The parameter Z=1/Oh characterizes the ability of a fluid to form droplets, and a Z value ranging between 1 and 10 is sufficient for stable droplet formation. The properties of the binder solutions at various PEI load-ings are summarized in Table 1 below. A nozzle radius (L) equal to 25 μm and a nozzle exit velocity (v) of 10 m/s were used in the calculations to determine if the fluid would form stable droplets utilizing DOD print modules. The viscosity was measured by Electromagnetically Spinning Viscometer (EMS) utilizing an EMS-100 from Kyoto Electronics Manu-facturing Co. The EMS method of measuring viscosity operates by placing a sample in a small test tube with an aluminum sphere inside, which is then placed inside of the instrument. The instrument contains two magnets attached to a rotor, which creates a rotating magnetic field. The rotating magnetic field induces eddy currents in the sphere which cause the sphere to rotate. The torque applied to the sphere is proportional to the difference in the angular veloc-ity of the magnetic field $\Omega_B$ and one of the spheres $\Omega_S$. The viscosity of the liquid is measured by creating a liner relationship between $(\Omega_B - \Omega_S)/\Omega_S$. The surface tension was measured by the Wilhemy plate technique using a custom-built instrument, in which a thin plate oriented perpendicular to the interface was lowered into the liquid and the forces on the plate were measured. The surface tension was calculated from the Wilhelmy equation as follows:

$$\gamma = \frac{F}{l \cos \theta}$$

in which F is the force, l is the wetting perimeter (2w+2d) with w being the plate width and d being the plate thickness, and θ is the contact angle between the liquid and the plate.

TABLE 1

| | | | | | | | |
|---|---|---|---|---|---|---|---|
| | | | Binder formulations with 75:25 $H_2O$:1-proanol solvent | | | | |
| Polymer Loading (wt. %) | Density ($\rho$) (g/mL) | Viscosity (mPa.s) | Surface Tension (mN/M) | Reynolds number (Re) | Webers Number (We) | Ohnesorge Number (Oh) | Z number |
| 10 | 1.01 | 4.49 | 36.6 | 56.24 | 72.14 | 0.15 | 6.77 |
| 15 | 1.02 | 6.77 | 37.5 | 37.30 | 72.14 | 0.23 | 4.57 |
| 20 | 1.02 | 9.99 | 36.1 | 25.28 | 72.14 | 0.34 | 3.04 |
| 25 | 1.03 | 15.9 | 37.3 | 15.88 | 72.14 | 0.53 | 1.95 |

Figure 2:
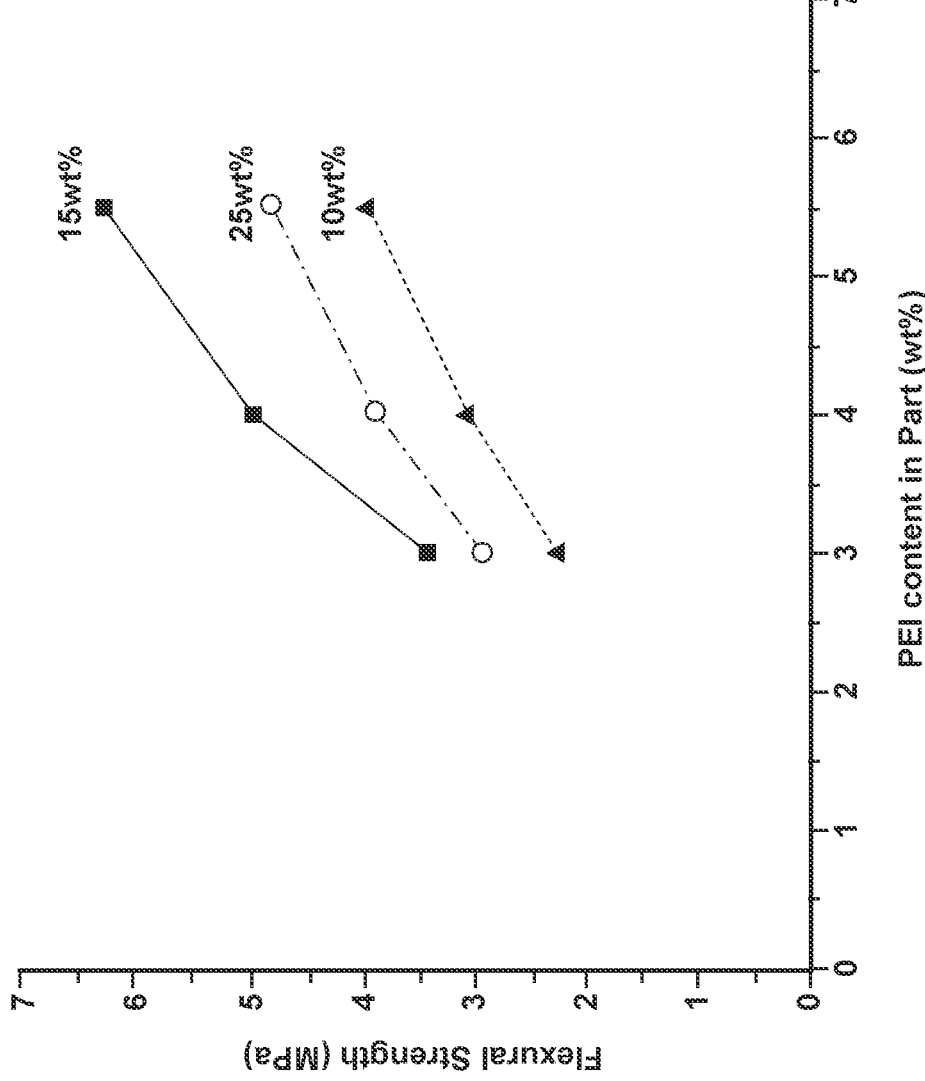
FIG. 2 is a graph of the flexural strength of BJAM-printed green parts at three different solid loadings of PEI binder in the binder solution.
Figure 3:
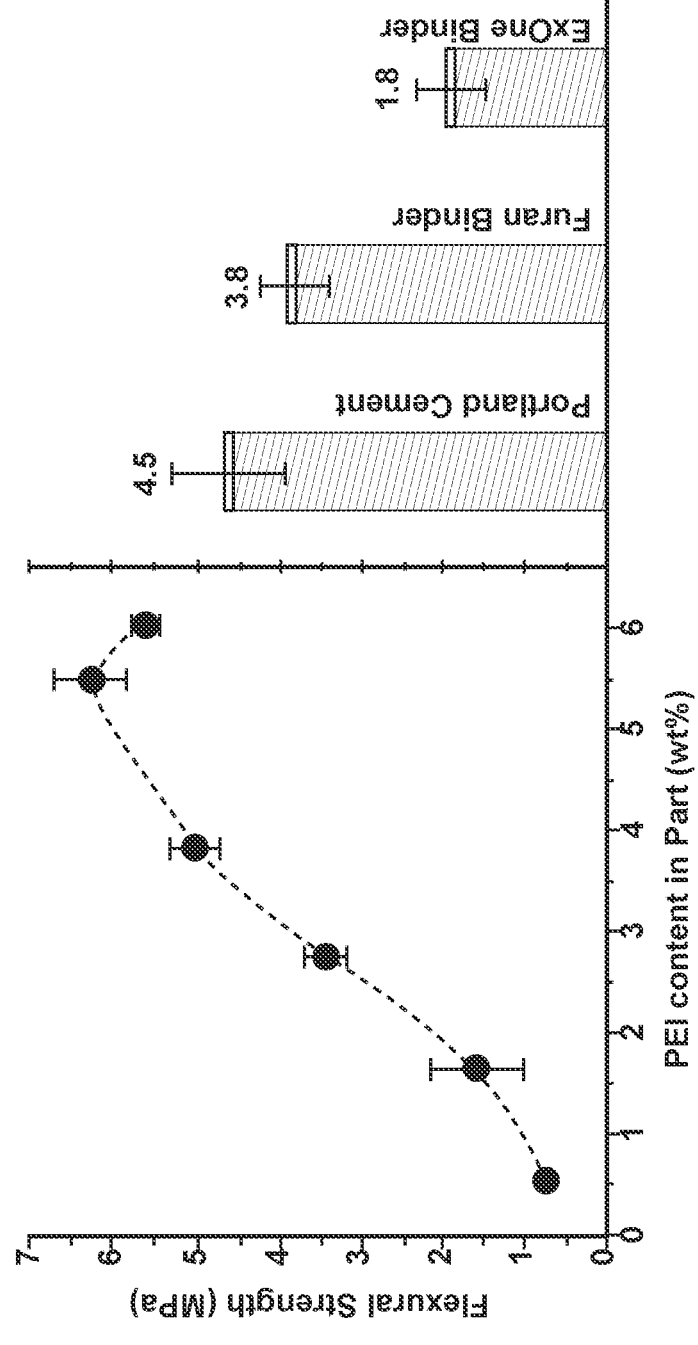
FIG. 3 is a graph of the flexural strength of BJAM-printed green parts with 15 wt. % PEI binder loading at varying binder saturations in the part, and comparison of those flexural strengths with that of other binders and cement.

For silica sand particles, 15 wt. % PEI in 75:25 water:1-propanol was identified as the optimal binder formulation. As shown in FIG. 2, binder formulations were each tested by evaluating flexural strength of printed parts with various PEI content. A 15 wt. % solid loading was found to provide optimum strength when utilizing silica sand powder. This testing of the PEI loadings optimized the printability and binder penetration into the powder bed but did not elucidate the optimal volume (saturation) of PEI in the formed part for maximum green part strength. To find the maximum strength, an increasing volume of PEI was incorporated into formed green parts, resulting in a nearly linear increase in green strength as shown on the left-hand side of FIG. 3. The PEI binder imparted a strength ranging from approximately 0.75 MPa to 6.30 MPa. A part with 5.5 wt. % PEI loading cured at 180° C. for 2 hours achieved a maximum green part strength of 6.28 MPa. There was an observed decrease in green strength at 6 wt. % PEI loading, which may have been due to one or more of fluid adsorption into the powder bed, solvent evaporation kinetics, and heat transfer during curing. The achieved maximum flexural strength of 6.28 MPa vastly exceeded the strength of printed silica sand parts using commercial polymeric binder (ExOne binder), measured at 1.82 MPa, as well as that of a conventional furan-phenol binder system, measured at 3.60 MPa, under optimized processing conditions as further shown on the right-hand side of FIG. 3. The flexural strength of printed silica sand parts with PEI surpasses any other sand polymer mixtures, even that of unreinforced concrete, which averages a flexural strength of 4.5 MPa. This exceptional green part strength enables the creation of high-strength parts for tooling using low-cost silica sand at high throughputs, which has the potential to revolutionize tooling for such industries as the automotive, aerospace, and consumer industries.

The primary and secondary amine groups of PEI provide reactivity, and thus enable either infiltration with a secondary polymeric material or in-situ reactive curing. The infiltrate reacts with the PEI binder and increases strength, or the powder is coated with a secondary component that reacts with the PEI binder upon contact, which can eliminate the need for post curing and enable higher throughput. This is possible with any polymeric binder containing groups that can react freely with a secondary monomeric or polymeric component. In the specific examples, the reaction that takes place is a Michael-addition reaction between the free amine groups on the PEI polymer and acrylate groups, where the examples includes ethyl cyanoacrylate (ECA), trimethylol-propane triacrylate (TMPTA), pentaerythritol triacrylate (PETA), and pentaerythritol tetraacrylate (PETeA) as the secondary component.

The samples were printed with an ExOne X1-Lab binder jet 3D printer with a size of 31.7 mm long, 12.7 mm wide, and 6.35 mm tall with 15% solid loading of PEI binder (or Furan binder as a comparative example). The saturation of the PEI binder system was 90%. The printer was equipped with a large nozzle printhead containing the SL-128 AA module from Fuji Films, which creates 80 pL drops and has 128 nozzles with a 50 μm diameter nozzle size. The printer utilized a single counter rotating roller for powder spreading and compaction. When introducing a new binder to the X1-Lab system, the previous binder must be cleared from the system by draining the previous binder and utilizing iso-propanol for removing residue from the previous binder. After flushing the system, the new binder is introduced to the printer fluid system. The new binder must be allowed to sit in the printer fluid system for several hours to permeate each individual jet/orifice in the printhead to prevent uneven printing later in the process. The efficacy of each nozzle is then quantified using a sheet of colored paper onto which a test patter is printed. This printed pattern allows for quantification of the operational status of all the nozzles. Any nozzle jets that are not functioning can be identified using the printer software and subsequently disengaged. To load the selected powder into the printer, the build platform is lowered by 4 mm. This is the depth of the build plate, which is utilized to remove the printed part from the printer. The feed platform is then lowered to the distance required for the height of the build, depending upon the size of the part being printed. The powder is then poured into the feed side of the printer and over the build platform. It is required to pour excess of the powder and to slightly mound it over in both the feed/supply side and the build side of the printer. The slight mounding of the powder ensures a flat surface after the roller is moved across the platform. The powder in the bed is then leveled using a counter rotating bar. The print parameters can then be adjusted. The main print parameters include saturation, heat, and layer thickness, which should be tuned depending on the binder, powder, and geometry of the target part. Heat is emitted during the printing to evaporate excess solvent from the binder solution. The heat is adjusted on the printer utilizing a dial output. During printing with the PEI binder, the heating was tuned based on the saturation, where higher saturations generally required higher heating power to evaporate the excess solvent introduced to the system. The layer thickness is determined by the powder that is being printed. The silica sand powder from ExOne Corporation has a D50, which is a mean particle diameter of 100 μm. When printing with the ExOne X1-Lab system a layer height that is double the D50 is suggested so that it can encompass the majority of particles when the roller moves the powder from the feed supply reservoir to the build reservoir. Such a layer height prevents particles that are larger than the D50 from disturbing the layer and causing issues such as inconsistent layers and short spreading. Thus, the layer thickness for the printed parts was set at 200 μm.

For reactive infiltration, the exceptional strength of silica sand green parts produced with PEI was demonstrated through post-processing using secondary polymer infiltration. The infiltration was possible due to the inherent porosity of BJAM parts, which allowed for low-viscosity polymers or monomers to absorb into the structure. Particularly, the printed samples were dip coated with Super Glue/ethyl cyanoacrylate by placing them into a disposable container containing the ECA. The ECA was absorbed into the samples through capillary forces which drew the ECA monomer into the porous samples. Absorption was allowed to proceed for 1 hour within a glove box to help reduce the occurrence of ECA self-polymerization and then the sample was roved from the container and placed onto a Teflon dish to dry before removing from the glove box. Ethyl cyanoacrylate (ECA) used to infiltrate into the PEI green parts was expected to induce Michael-addition reactions with amine groups. After drying at room temperature, 3-point bending tests were conducted. This mechanical testing was performed using an Instron 4465. The testing utilized MPIF Standard 15 or its equivalent to ASTM B312. This standard is conventionally used in the powder metallurgy industry, analogous to the process of Binder Jetting. The 3-point bend instrument utilized a stepper motor that moved at a rate of 2.54 mm/min. The flexural strength ($\sigma$) was determined with the following equation:

$$\sigma = \frac{3FL}{2bd^2}$$

in which F is the force at the fracture point, L is the distance between two supports, and b and d are the width and thickness of the test sample, respectively.

Figure 4:
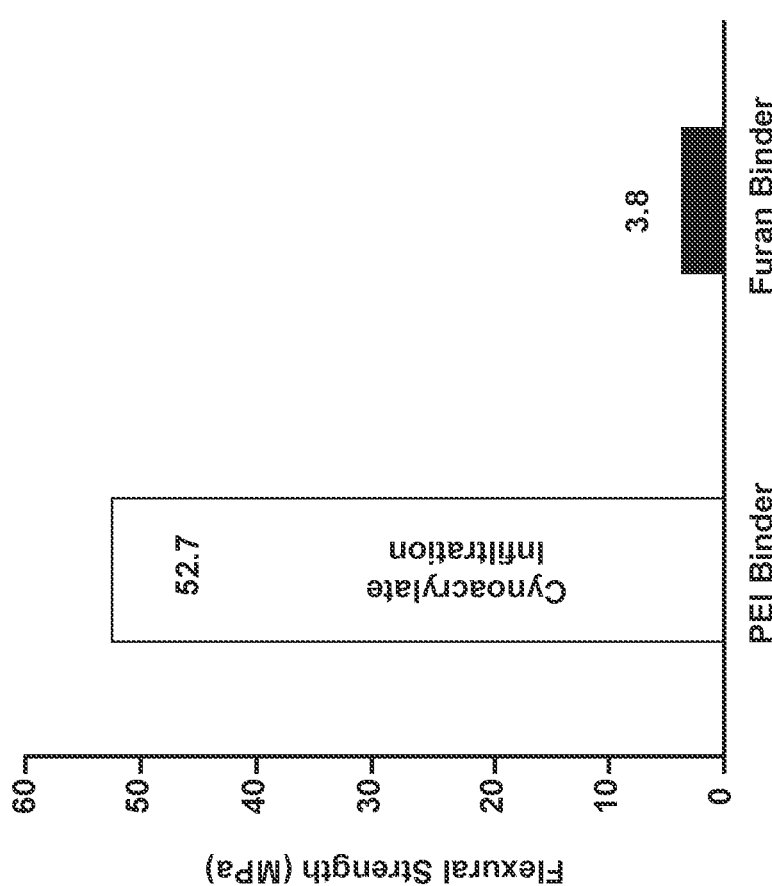
FIG. 4 is a graph of the flexural strength of BJAM-printed green parts that are infiltrated with cyanoacrylate comparing PEI binder to furan binder.

As shown in FIG. 4, the secondary ECA infiltration resulted in an increase in the flexural strength by a factor of eight for PEI to 52.74±2.18 MPa from 6.28±0.48 MPa. These ECA-infiltrated PEI parts were compared with silica sand parts printed using a conventional furan no-bake binder that was infiltrated with ECA by the same method. The ECA-infiltrated furan sand parts demonstrated an insignificant increase in flexural strength to 3.70±0.24 MPa from 3.60±0.45 MPa.

Figure 5:
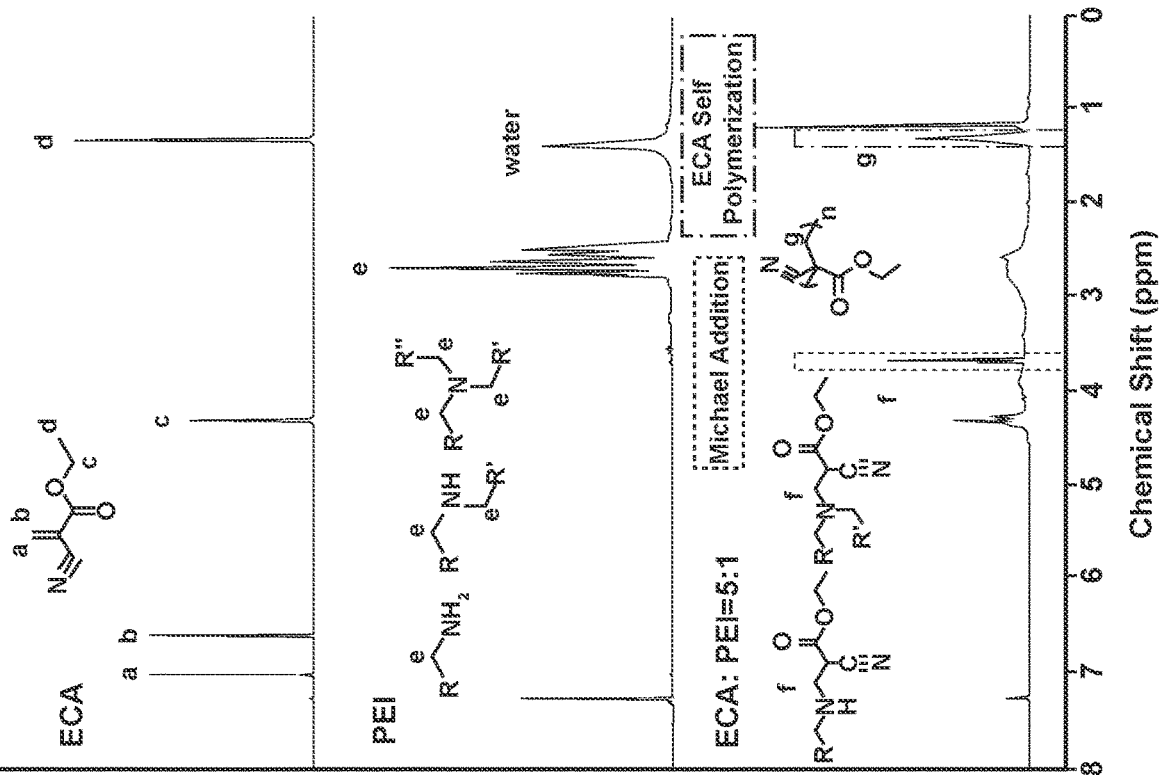
FIG. 5 is a graph of $^1$H-NMR spectra of ECA, PEI, and ECA:PEI (5:1)
Figure 6:
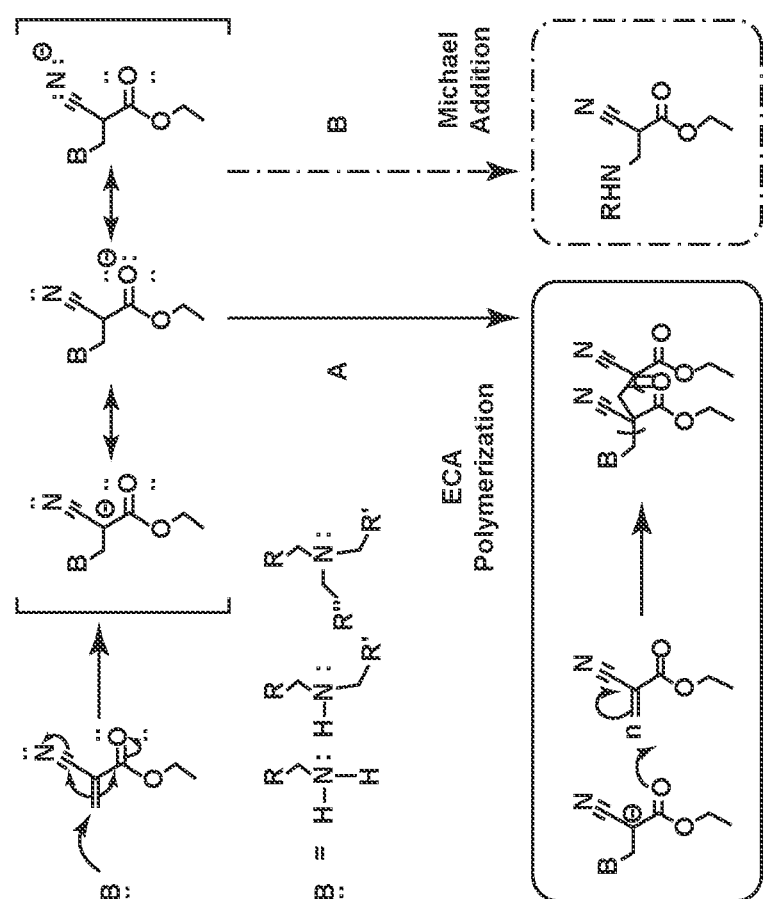
FIG. 6 is a schematic view of Michael addition and ECA polymerization in accordance with embodiments of the binder system and method of the disclosure.

The unprecedented strength of the ECA-infiltrated parts of PEI indicates the occurrence of a reactive infiltration, such as a Michael-addition reaction between the binder and ECA, followed by chain polymerization of ECA. $^1$H-NMR was used to study the mixing of ECA and PEI (ECA to PEI ratio of 5:1) and confirmed the occurrence of Michael-addition reactions between ECA and the residual free amine groups of the PEI within the porous green part as shown in FIG. 5 ("a" and "b" are representative of C=C, "c" is representative of $CH_2$, "d" is representative of $CH_3$, "e" is representative of all primary, secondary, and tertiary amins connected to $CH_2$, "f" is representative of the Michael addition reaction, and "g" is representative of the anionic addition polymerization of ECA). NMR spectra were acquired on Bruker 400 MHz NMR Spectrometer at room temperature in d-Chloroform ($CDCl_3$) (7.27 ppm as reference). The average number of transients for $^1$H measurement was 128 and the relaxation time was 1 s. Particularly, the resonances associated with the acrylate double bond in ECA disappeared, whereas the resonances associated with the PEI molecule were still present after the reaction. The reacted mixture showed the appearance of two new resonances. One resonance represents the formation of amine-acrylate linkage by the Michael-addition at 3.6 ppm, namely, a methylene bridge between the secondary or tertiary amines of PEI and the carbon atom originally from the C=C bond in ECA. The second new resonance around 1.4 ppm indicates the occurrence of anionic addition polymerization of ECA. Mechanistically, the two-electron withdrawing cyano and ester groups in ECA assisted in triggering a nucleophilic attack by PEI on the double bond to initiate the chain polymerization as shown schematically in FIG. 6. This linking reaction between the ECA and PEI leads to the high strength observed in the sample parts. The high flexural strength of the infiltrated PEI-printed silica sand parts, ~53 MPa, surpasses construction materials such as masonry or brick-and-mortar structures, with the ability to support at least 300 times its own weight. In particular, the sample parts survived being run over by an automotive vehicle and were capable of supporting an aluminum block 300 times their own weight. The exceptional strength of the infiltrated PEI parts expands structural applications to those similar to concrete and allows for new tooling applications such as autoclave tooling, which experiences high working pressures and temperature.

For reactive coating, the reactivity of the binder system was utilized by coating the powder particles with the secondary polymeric or monomeric material. The binder reacts with the coated polymeric or monomeric material on the powder particles and solidifies in the powder bed. This method provides a significantly advanced strategy to form stronger green parts or green parts that do not require external energy to cure, that will reduce time and energy consumption. This method provides flexibility in forming large parts without requiring a post-curing step, and thus reduces process time and cost, which may increase the productivity of BJAM systems. The method requires that the two chosen polymers and/or monomers must have significant reactive interaction with each other to solidify in the powder bed or provide other functionality. In the examples discussed below, the reactive system provided the functionality of water solubility, which allows parts formed using the mixture to serve as washout tooling, a rapidly growing sector of tooling. Reactive powder coating and in-situ curing can be utilized in a wide range of reactive systems that provides versatility in the process.

Figure 7:
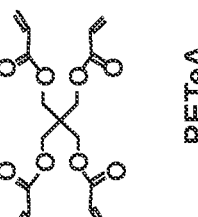
FIG. 7 is a schematic view of embodiments of the Michael donor and Michael acceptor of the Michael addition reaction in accordance with embodiments of the disclosure.
Figure 8:
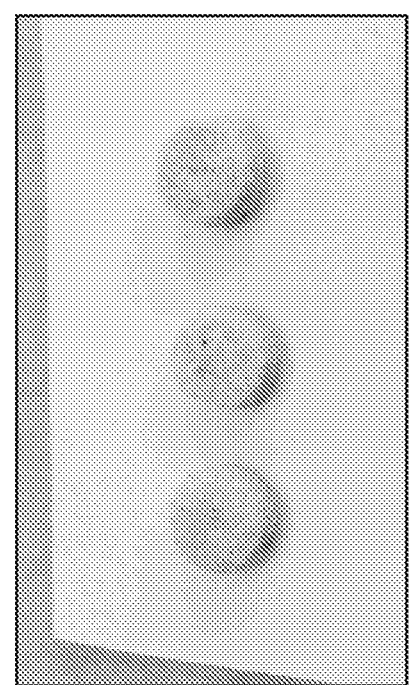
FIG. 8 is a pictorial view of binder jet additively manu-factured parts produced by the binder jet additive manufac-turing (BJAM) process in accordance with embodiments of the disclosure.

In the examples as shown in FIG. 7, the binder was PEI, which acted as the Michael donor, and acrylates such as trimethylolpropane triacrylate (TMPTA), pentaerythritol triacrylate (PETA), and pentaerythritol tetraacrylate (PETeA) were coated on the silica sand particles and acted as the Michael acceptor. 20 g of sand was mixed with 2 g of the acrylate in an industrial mixer for 30 minutes to coat the sand particles in the monomer. Once the sand was coated completely, it was then mixed with the PEI binder and packed into molds to form handmade bars. Each bar solidified without any other stimuli. The bars formed with TMPTA and PETeA were strong while the bars formed with PETA were less strong. Trials were also run using the same sand monomer mixtures in an ExOne X1-Lab printer with the PEI binder. These mixtures formed solid pucks during printing as shown by example in FIG. 8, without the need for external stimuli for curing, i.e. in-situ curing.

The present embodiments also present washout tooling capability. Washout tooling is a process in which the entire tool can be removed by simply washing it away with water or other solvents. The washout functionality enables the creation of tooling with complex, hollow composite structures. For example, washout tooling can be used for the creation of ducting in the aerospace and defense sectors and structurally graded cores for composite sandwich panels. Silica sand green parts formed with the PEI binder provide exceptional strength but can also function as washout tools as they can be easily dissolved in water and washed out. The ability to dissolve the green part arises from the noncovalent bonding that governs the interfacial interaction between the PEI binder and the silica surface. Water can disrupt the hydrogen bonding and redissolve the PEI in the parts, resulting in the removal of the binding material in the green part. All of the conventional tooling for creating hollow composites, such as inflatable bladders, plaster, or eutectic salts, have challenges involving slow washout times, weak mechanical properties, and poor thermal properties. Using BJAM to create tooling from silica sand with PEI may mitigate these issues, as the robust green parts solve a major bottleneck of producing viable complex preforms for washout tooling. Parts infiltrated with ECA also remain soluble in water, allowing them to also be used for washout tooling. However, ECA-infiltrate parts remain soluble only within about 48 hours of the infiltration. The composite becomes insoluble after 48 hours, forming a stable structure that can be used for permanent fixtures. The washable state of ECA-infiltrated parts is ideal for use in temporal preform applications, such as washout tooling, and the insoluble ECA-infiltrated parts enable structurally robust permanent fixtures such as exterior and interior building materials.

In summary, the use of PEI binder for BJAM of silica sand allows for the production of extremely versatile green parts that provide high strength, sacrificial washout functionality, and reactive infiltration capability. The green strength of the silica sand parts is significantly enhanced to double that of the conventional binder by forming a corrugated nano-structure of interfacial H-boding. The residual amine groups of PEI the allow for reactive cyanoacrylate infiltration, thus achieving a further eightfold increase in the strength of a printed part, exceeding any known polymer sand composite or building material such as unreinforced concrete and masonry. The ability to create these strong components opens industrial tooling applications from autoclave tooling to metal stamping using BJAM, and also opens industrial washout tooling applications toward the manufacturing of hollow composite structures by creating versatile interfaces including corrugated interfacial H-bonding, reactive initiation sites for cyanoacrylate polymerization, and washable surfaces.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A method of binder jet additive manufacturing, the method comprising:
   feeding a supply of powder particles to a powder bed layer-by-layer with a leveling roller;
   delivering a binder onto the powder bed in select locations of each layer to bind the layers of powder together and to thereby form a porous green part, wherein the binder is an organic material; and
   introducing to the binder a secondary component that chemically reacts with the binder to form a solid polymer matrix around the powder particles;
   wherein the secondary component is introduced either by:
   (i) infiltration of the secondary component into the porous green part; or (ii) by combining the secondary component with the powder particles prior to feeding the powder particles to the powder bed;
   wherein the organic binder and the secondary component together are a group of either:
   (i) a Michael donor and a Michael acceptor, wherein the Michael donor is one of polyethyleneimine (PEI), glutathione, dithiothreitol, trithiothreitol, 1,2-propanedithiol, 1,2-benzenedithiol, trimethylolpropane tris(3-mercaptopropionate), pentaerythriotol (3-mercaptopropionate), trimethylamine, ethylenediamine, dimethylethylenediamine, cadaverine, 1,2-diaminopropane, phenylenediamine, diethylenetriamine, tris (2-aminoethyl)amine, and triethylenetetramine, and wherein the Michael acceptor is one of ethylene glycol diacrylate, trimethylolpropane triacrylate (TMPTA), hexanediol diacrylate, ethyl cyanoacrylate (ECA), pentaerythritol tetraacrylate (PETeA), pentaerythritol triacrylate (PETA), and tris[2-(acryloyloxy)ethyl] isocyanurate; or
   (ii) an epoxy resin and a nucleophile that is polyethyleneimine (PEI).

2. The method of claim 1, wherein the step of combining the secondary component with the powder particles includes either: (i) mixing the secondary component with the powder particles; or (ii) coating of the secondary component on the powder particles.

3. The method of claim 1, wherein the binder is present in an amount in the range of 0.1 wt. % to 90 wt. % relative to the powder particles.

4. The method of claim 1, wherein a saturation of the powder bed with the binder is in the range of 5% to 140%.

5. The method of claim 1, wherein the secondary component constitutes 1 to 50 volume % of the green part.

6. The method of claim 1, wherein the binder is delivered by drop-on-demand inkjetting.

7. The method of claim 6, wherein the drop-on-demand inkjetting is one of piezoelectric inkjetting or thermal inkjetting.

8. The method of claim 1, wherein the organic binder and the secondary component are monomers, polymers, or a mix of both.

* * * * *